P. T. COFFIELD.
VEHICLE TIRE REPAIRING.
APPLICATION FILED APR. 2, 1919.

1,372,938.

Patented Mar. 29, 1921.

INVENTOR.
Peter T. Coffield
BY A. B. Bowman
ATTORNEY

UNITED STATES PATENT OFFICE.

PETER T. COFFIELD, OF LA MESA, CALIFORNIA.

VEHICLE-TIRE REPAIRING.

1,372,938.　　　　　Specification of Letters Patent.　　Patented Mar. 29, 1921.

Application filed April 2, 1919. Serial No. 286,860.

*To all whom it may concern:*

Be it known that I, PETER T. COFFIELD, a citizen of the United States, residing at La Mesa, in the county of San Diego and State of California, have invented certain new and useful Improvements in Vehicle-Tire Repairing, of which the following is a specification.

My invention relates to a means and method of resurfacing and repairing vehicle tires more particularly pneumatic tires after the tread portion has been worn down and the fabric is about to be exposed to wear from contacting with the road or it may be applied to a new tire after slight wear as desired and the objects of my invention are: first, to provide a means and method of covering the tread surface of vehicle tires, or any portion thereof, with thin rubber strips or bands for renewing the tread surface; second, to provide a means and method for repairing pneumatic tires when a repair shop is not convenient and vulcanizing impossible; third, to provide a means and method of this class which is very economical of construction and application and fourth, to provide a means and method of this class whereby the tread surface of tires may be renewed from time to time after it wears down so that a tire may be made to last indefinitely or until the fabric decays.

Figure 1:
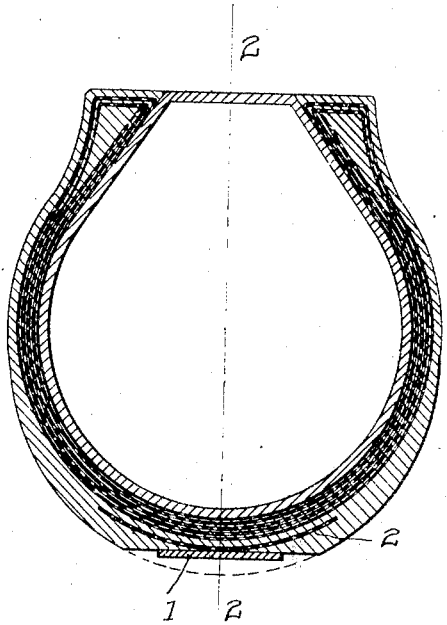
Figure 2:
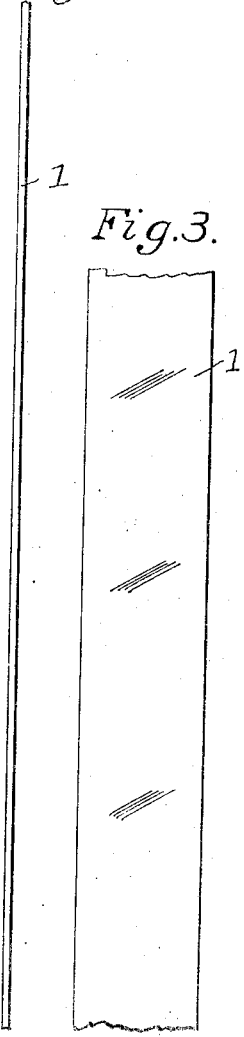
Figure 2:
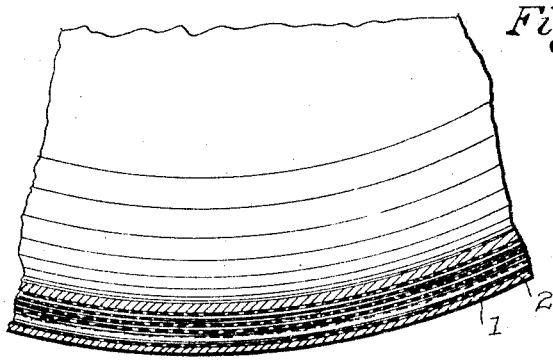

With these and other objects in view as will appear hereinafter, my invention consists of certain novel features of construction, combination and arrangement and the novel method of repairing and renewing the tread surface of tires or any portion thereof as will be hereinafter described in detail and particularly set forth in the appended claims, reference being had to the accompanying drawings and to the characters of reference thereon which form a part of this application, in which:

Figure 1 is a transverse sectional view of a conventional vehicle tire showing the tread surface worn down to the breaker strip and showing my means secured thereto for repairing and renewing the tread surface and showing by dotted lines the approximate original tread surface; Fig. 2 is a fragmentary longitudinal sectional view through 2—2 of Fig. 1; Fig. 3 is a fragmentary plan view of the strip of rubber secured to the worn tread surface for renewing the same and Fig. 4 is an edge view thereof.

Similar characters of reference refer to similar parts and portions throughout the several views of the drawings.

My invention consists in cementing a thin rubber band or strips of rubber 1 on the worn portions of a tire or completely encircling the tire after the tread portion of the tire has worn thin and the fabric of the tire usually termed the breaker strip 2 is about to be exposed to wear from contact with the road. This rubber band or rubber strip is preferably composed of properly cured rubber of the proper width to protect the tread surface from further wear and preferably very thin approximately one-sixteenth to three-thirty-seconds of an inch thick and coated on one side with adhesive rubber so that it can be quickly and firmly cemented to the worn tread surface without having to remove the tire from the rim.

These bands and strips of rubber as hereinbefore described, are preferably made thin as described to prevent their crushing from the load and can be renewed or replaced very quickly when worn out and as often as is necessary to protect the fabric and tread surface of the tire.

It is obvious that with this means and method the tread surface of a vehicle tire may be kept built up to any thickness desired by replacing these strips with new ones as fast as they are worn off, it being preferred, however, to permit the tire to wear down near the breaker strip and then renew the tread surface with this thin layer as the tread surface is broader after being worn to this position.

Having thus described my invention what I claim as new and desire to secure by Letters Patent, is:

1. In a means of the class described, the combination with a conventional pneumatic tire tread member, of a thin rubber band coated on one side with adhesive rubber and of sufficient width and length to protect the fabric of said tire tread member firmly cemented on and extending around the tread portion of said tire.

2. In a means to prolong the life of the tread member of pneumatic tires, a thin single sheet band of perfectly cured rubber cemented to the tread portion of the tire of sufficient width and length to prevent the fabric of the tread member of the tire from contact with the road whereby a new wearing surface may be added to the tread portion of the tire as it is needed.

3. In a means to prolong the life of the outer casing of pneumatic tires, a thin rubber band of sufficient width to protect the said casing from wear, said rubber band encircling the periphery of said casing and cemented thereto.

In testimony whereof I have hereunto set my hand at San Diego, California, this 26th day of March, 1919.

PETER T. COFFIELD.